United States Patent [19]
Nakatsuhara

[11] Patent Number: 4,609,077
[45] Date of Patent: Sep. 2, 1986

[54] INTEGRAL-TYPE DISK BRAKE

[75] Inventor: Youichi Nakatsuhara, Toyota, Japan

[73] Assignee: Aisin Seiki Kabushiki Kaisha, Kariya, Japan

[21] Appl. No.: 646,154

[22] Filed: Aug. 31, 1984

[30] Foreign Application Priority Data

Sep. 29, 1983 [JP] Japan .............................. 58-151013[U]

[51] Int. Cl.$^4$ ...................... F16D 65/38; F16D 65/40
[52] U.S. Cl. ............................... 188/73.38; 188/73.39; 188/250 E
[58] Field of Search ................... 188/73.1, 72.4, 73.31, 188/73.35, 73.36, 73.37, 73.38, 73.39, 73.43, 73.45, 205 A, 218 A, 250 E, 250 F; 192/30 V

[56] References Cited

U.S. PATENT DOCUMENTS

| 4,299,311 | 11/1981 | Smirai et al. | 188/73.43 X |
| 4,313,527 | 2/1982 | Pickel | 188/73.1 X |
| 4,385,680 | 5/1983 | DuCharme et al. | 188/73.45 X |
| 4,467,897 | 8/1984 | Kubo et al. | 188/73.38 |
| 4,509,619 | 4/1985 | Baynes et al. | 188/73.38 X |

FOREIGN PATENT DOCUMENTS

| 1121593 | 7/1968 | United Kingdom | 188/73.39 |
| 2017236 | 10/1979 | United Kingdom | 188/73.36 |

Primary Examiner—Bruce H. Stoner, Jr.
Assistant Examiner—Robert J. Oberleitner
Attorney, Agent, or Firm—Oblon, Fisher, Spivak, McClelland & Maier

[57] ABSTRACT

An integral-type disk brake that can be readily assembled and which includes a caliper assembly, a pair of arms circumferentially spaced apart along the outer periphery of a disk rotor, a pair of protrusions extending radially outwardly of the rotor and engaging with the arms, and a pair of leaf springs resiliently engaging with the arms. When the caliper assembly including an inner pad and an outer pad is inserted between the arms during assembly, the arms push the springs and bend them circumferentially toward the axis of the rotor, thereby facilitating the insertion. The springs hold the outer pad into resilient engagement with the arms.

3 Claims, 11 Drawing Figures

INTEGRAL-TYPE DISK BRAKE

FIELD OF THE INVENTION

The present invention relates to an integral-type disk brake installed in an automobile or similar vehicle and, more particularly, to an integral-type disk brake having an outer pad which is rigidly supported and does not rattle.

BACKGROUND OF THE INVENTION

A disk brake of this type comprises a caliper assembly consisting of a caliper body and inner and outer pads both of which are held to the caliper body, and the assembly is mounted to a support formed integrally with a knuckle. One example of the disk brake of this kind as exemplified in Japanese Patent Laid-Open No. 94644/1983 is shown in FIGS. 10 and 11 where a caliper assembly 1 is mounted to a support 4 by means of a pair of slide pins 2 such that the assembly 1 extends over the outer fringe of a disk rotor 3. The pins 2 are so mounted to the assembly 1 as to be slidable along it. During assemblying operation of the caliper assembly, one of the slide pins 2 is first placed opposite to one hole 4a extending through the support 4, and then is manually held in that position. Under this condition, the slide pin 2 is inserted into the hole 4a and supported. Then, the caliper assembly 1 is rotated about the slide pin 2 toward the outer fringe of the rotor 3. Thereafter, the other slide pin 2 is fitted into another hole 4b extending through the support 4 by bringing a notch 4c formed in the pin into registry with the hole 4b, and then the pin is fitted into the hole, thus mounting the assembly to the support 4.

The caliper assembly 1 further includes an inner pad 5 and an outer pad 8. The inner pad 5 has a back plate 5a made of a metal. A pad gripper 6a consisting of a spring is mounted on the back of the back plate 5a, and has a plurality of legs resiliently fitted in the hole within a piston 7. Thus, the inner pad 5 is held to the piston 7. Similarly, the outer pad 8 has a back plate 8a made of a metal. Another pad gripper 6b consisting of a spring is mounted on the back of the back plate 8a, and has a plurality of legs resiliently secured to the inner wall of the caliper body 1, whereby the outer pad 8 is supported to the body 1. After the assembly 1 has been mounted to the support 4, the pads 5 and 8 are carried on both arms of the support 4.

It is cumbersome to mount the caliper assembly 1 of the prior art disk brake to the support 4. Further, there arises the possibility that the pads 5 and 8, especially the outer pad 8, are not rigidly secured to the caliper body 1 or the support 4. This allows the outer pad 8 to bounce and rattle. In addition, the inner pad 5 may not be always securely fixed to the piston 4. Hence, the inner pad 5 may also bounce and rattle.

SUMMARY OF THE INVENTION

In view of the foregoing difficulties with the prior art disk brake, it is an object of the present invention to provide a disk brake of the aforementioned type which has a caliper assembly that can readily be mounted to a support, and which has an outer pad that is prevented from rattling.

It is another object of the invention to provide a disk brake of the above type having an inner pad that does not bounce, and hence does not rattle.

These objects are achieved in accordance with the present invention by an integral-type disk brake comprising: a caliper assembly consisting of a caliper body, an inner pad held to a piston via a spring member within the caliper body, and an outer pad held opposite to the inner pad and kept at a certain distance from the inner pad via another spring member within the caliper body; a pair of arms circumferentially spaced a certain distance from each other along the outer periphery of a disk rotor mounted on a support that is formed integrally with a knuckle, the caliper assembly being disposed between the arms so as to extend over the outer periphery of the disk rotor; and a pair of protrusions extending radially outwardly from opposite ends of metal back plates respectively attached to the inner and outer pads, the opposite ends being at the side of the outer periphery of the disk rotor, the protrusions being in engagement with the arms on the support; the caliper assembly being held to the support in such a way that it can slide axially of the disk rotor.

In one feature of the disk brake of the invention, a pair of spring members is mounted at opposite ends of the metal back plate attached to the outer pad, the opposite ends being at the side of the axis of the disk rotor, the spring members extending toward the outer periphery of the disk rotor and being capable of circumferentially deflecting toward and away from each other, and wherein the front ends of the spring members are in resilient contact with the side surfaces of the arms which face the axis of the disk rotor.

In another feature of the disk brake of the invention, the spring member acting to support the inner pad has a plurality of legs which are in resilient contact with the inner wall of the hole within the piston. This spring member is mounted at the back of the back plate on the inner pad, and, after the inner pad has been mounted on the piston, acts to displace the inner pad toward the axis of the disk rotor from the position assumed when the caliper assembly is being assembled.

According to the invention, when the caliper assembly having the pads held to the caliper body is disposed over the outer periphery of the disk rotor, the caliper assembly is first placed in position between the arms by the spring members attached to the back plate on the outer pad. Then, the spring members guide the assembly to fully insert it between the arms. After the completion of this insertion, the spring members are circumferentially urged away from each other and return to their original positions. Under this condition, the front ends of the spring members resiliently engage with the side surfaces of the arms which face the axis of the disk rotor.

Also, according to the invention, after the caliper assembly has been mounted to the support and the protrusions on the inner pad are carried on the arms on the support, the arms move up the inner pad toward the outer periphery of the disk rotor away from the piston. The result is that at least one of the legs of the spring member is pressed against the inner wall of the hole within the piston. Therefore, the spring member prevents the inner pad from rattling.

Further, the invention permits the caliper assembly to be readily inserted between the arms on the support. Additionally, the caliper assembly is located and fixed to the support only by this inserting operation. Hence, the caliper assembly is easy to install. Furthermore, since the protrusions on the back plates on the outer pad are in resilient engagement with the arms on the support by the action of the spring members after the caliper assembly has been mounted, the outer pad is prevented from rattling.

Other objects, features and advantages of the present invention may best be understood by reference to the following description taken in connection with the accompanying drawings.

DETAILED DESCRIPTION OF THE INVENTION

Figure 1:
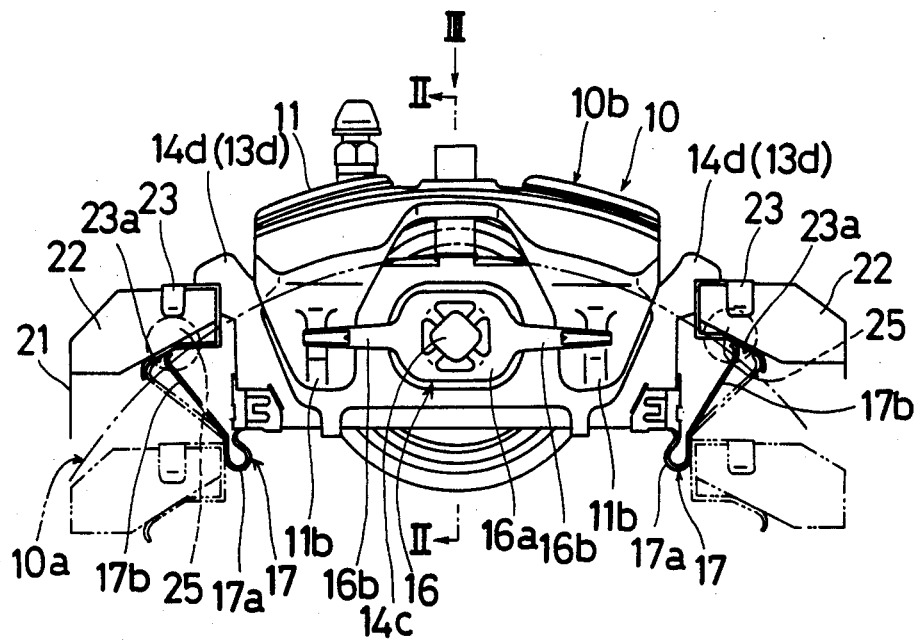
FIG. 1 is a front elevation of a disk brake according to the present invention, as viewed from the outside the vehicle.
Figure 2:
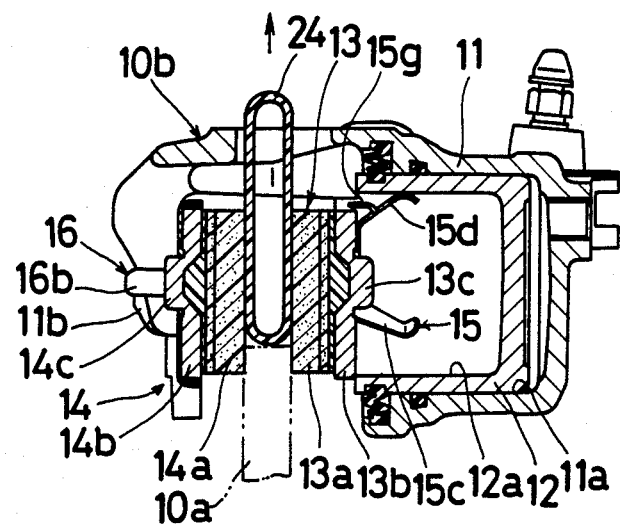
FIG. 2 is a cross-sectional view taken along the line II—II of FIG. 1.
Figure 3:
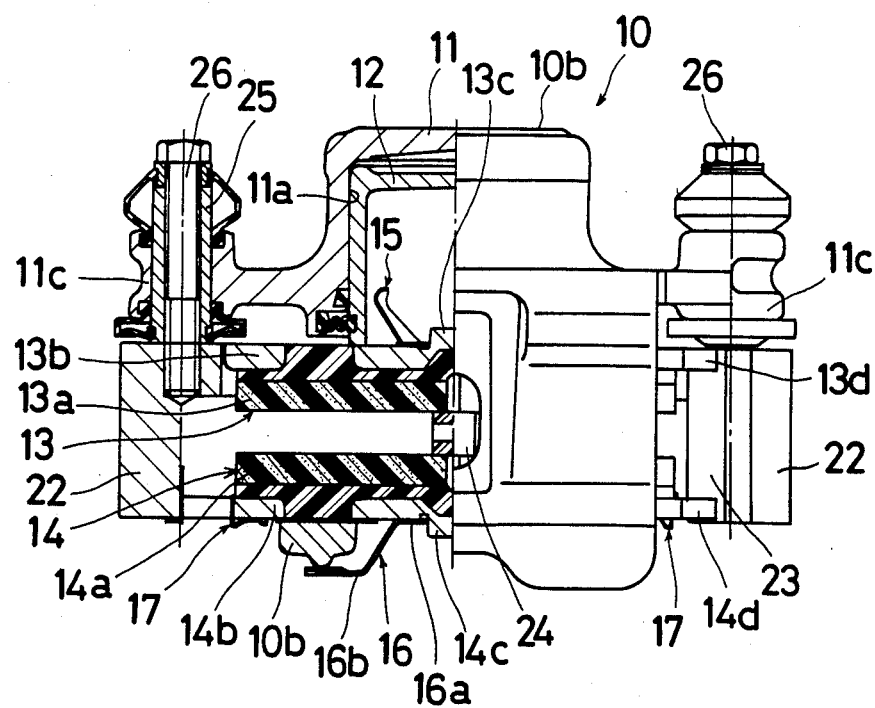
FIG. 3 is a plan view partially in cross section taken along the direction indicated by the arrow III of FIG. 1.

Referring to FIGS. 1-3, there is shown a disk brake embodying the concept of the present invention. This brake, generally indicated by reference numeral 10, consists of a disk rotor 10a and a caliper assembly 10b that is mounted to a support 21. The rotor 10a is rigidly secured to a wheel hub that is rotatably held to a steering knuckle (not shown). The support 21 is formed integrally with the steering knuckle, and extends over the outer periphery of the disk rotor 10a. The caliper assembly 10b is comprised of a caliper body 11 that is substantially C-shaped in cross section, a cylinder 11a within the body 11, a piston 12 inserted in the cylinder 11 so as to be slidable in a liquidtight manner, an inner pad 13 held in the inner hole 12a within the piston 12, and an outer pad 14. The caliper body 11 has a pair of reaction legs 11b to which an outer pad 14 is securely fixed.

Figure 8:
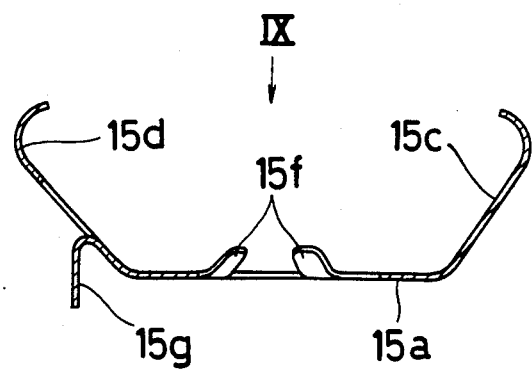
FIG. 8 is an enlarged view of the first spring shown in FIG. 2.
Figure 9:
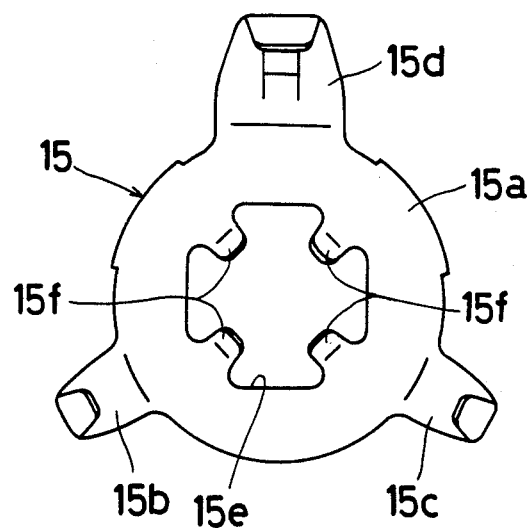
FIG. 9 is a view taken along the direction indicated by the arrow IX of FIG. 8.
Figure 10:
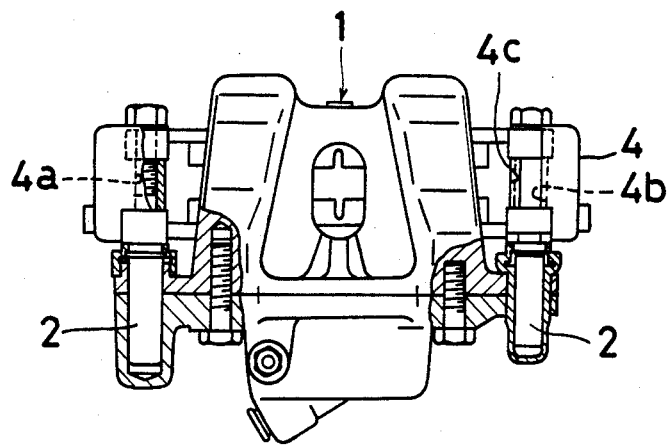
FIG. 10 is a partially cutaway plan view of a conventional disk brake.
Figure 11:
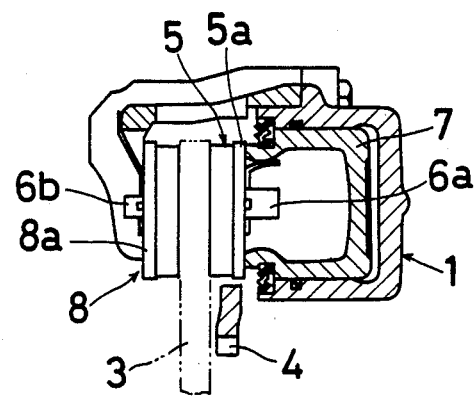
FIG. 11 is a cross-sectional view of the brake shown in FIG. 10.

The inner pad 13 consists of a flat plate 13a made from a frictional material, a back plate 13b made from a metal, and a rectangular protrusion 13c mounted on the back of the back plate 13b. A first spring 15 which supports the inner pad 13 is fixedly fitted over the protrusion 13c, and serves to prevent the inner pad from rattling. As shown in FIGS. 8 and 9, the spring 15 is composed of a circular plate 15a, three legs 15b, 15c, 15d formed around the plate 15a, and four claws 15f mounted on the inner periphery of a rectangular hole 15e formed in the plate 15a. The claws 15f have the same form and extend radially toward the center of the back surface of the plate 15a. The legs 15b, 15c, and 15d are substantially equally spaced around the plate 15a and extend radially toward the back side of the plate 15a and toward the outer periphery of the back side. The legs 15b and 15c are similar in shape. The leg 15d is wider than the legs 15b and 15c and extends a certain distance outwardly from the legs 15b and 15c. A portion of the intermediate portion of the leg 15d is raised and extends longitudinally. This raised portion extends toward the surface of the plate 15a and forms a locating leg 15g. The claws 15f prevent the first spring 15 from disengaging from the angular protrusion 13c. The spring 15 is fitted in the hole 12a inside the piston while fixed to the protrusion 13c, and the front ends of the legs 15b, 15c, 15d are in resilient contact with the inner wall of the hole 12a. Thus, the spring 15 is anchored to the piston 12 in such a way that it slightly displaces the inner pad 13 toward the axis of the rotor 10a.

The outer pad 14 consists of a flat plate 14a made from a frictional material, a back plate 14b made from a metal, and an angular protrusion 14c mounted on the back of the plate 14b, in the same way as the inner pad 13. A second spring 16 which supports the outer pad 14 is fixedly fitted over the protrusion 14c. The second spring 16 is comprised of an elliptical plate 16a and two arms 16b extending out from the plate 16a. The second spring 16 is fitted over the protrusion 14c like the first spring 15. The front ends of the arms 16b are anchored to the protruding portions of the reaction legs 11b of the caliper body 11. As such, the second spring 16 forces the outer pad 14 to be held to the caliper body 11 such that the pads 13 and 14 are opposed to each other with a certain distance therebetween.

As can be seen from FIGS. 1 and 3, the pads 13 and 14 are provided with protrusions 13d and 14d, respectively, which extend radially outwardly from the opposite ends of the back plates 13b and 14b which are at the side of the outer periphery of the disk rotor 10a. The protrusions 13d and 14d are in engagement with two arms 22 on the side of the outer periphery of the rotor 10a such that these protrusions can be disengaged from the arms mounted on the support 21. These arms 22 are circumferentially spaced apart a given distance and extend over the outer periphery of the rotor 10a.

In the present example, a pair of third springs 17 each of which consists of a leaf spring is disposed at opposite ends of the back plate 14b of the outer pad 14 which face the axis of the disk rotor 10a. These springs 17 extend toward the outer periphery of the rotor 10a, and can circumferentially deflect toward and away from each other.

Figure 4:
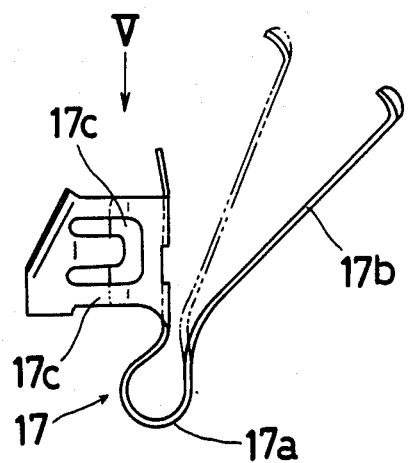
FIG. 4 is an enlarged view of one of the third springs shown in FIG. 1.
Figure 5:
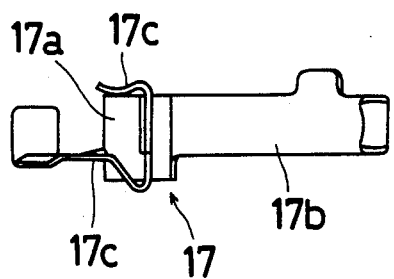
FIG. 5 is a view taken along the direction indicated by the arrow V of FIG. 4.
Figures 6, 7:
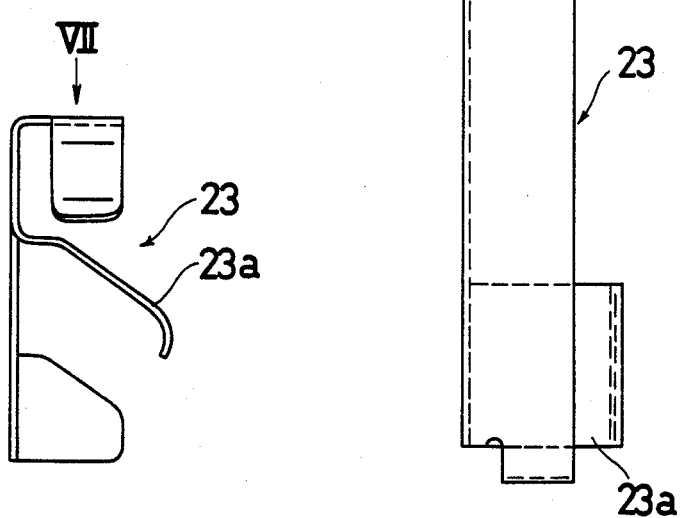
FIG. 6 is an enlarged view of one of the clips shown in FIG. 1.
FIG. 7 is a view taken along the direction indicated by the arrow VII of FIG. 6.

Referring to FIGS. 4 and 5, each of the third springs 17 consists of a bent portion 17a, a flat plate portion 17b extending from the bent portion 17a, and a portion 17c at which the spring is mounted. The distance between the outer sides of the bent portions 17a of the third springs 17 is substantially equal to the distance between the arms 22 on the support 21. Two clips 23 are fitted on their respective arms 22 and have inclined surfaces 23a which are on the side of the axis of the rotor 10a. The length of the flat plate portions 17b is so determined that when the protrusions 14d on the back plate 14b on the outer pad are brought into engagement with the arms 22 on the support 21, the springs 17 come into resilient contact with their respective inclined surfaces 23a of the clips 23. In the caliper assembly 10b in the present example, a spacer 24 is interposed between the frictional members 13a and 14a of the pads 13 and 14, as shown in FIG. 2.

The caliper assembly 10b having the outer pad 14 constructed in this way extends over the outer periphery of the disk rotor 10a as indicated by the arrow III of FIG. 1, and is placed between the arms 22 on the support 21. The protrusions 13d and 14d of the pads 13 and 14 which lie between the arms 22 engage with their respective arms 22. The caliper body 11 further has a pair of cylindrical portions 11c to which hollow support pins 25 are mounted so as to be slidable through them. The pins 25 are securely fixed to the support 21 by bolts 26, so that the assembly can make sliding movement relative to the support 21 axially of the rotor 10a. When the assembly is mounted in this manner, the spacer 24 is pushed and removed by the outer periphery of the rotor 10a, as indicated by the arrow of FIG. 2.

When the caliper assembly 10b is inserted between the arms 22 on the support 21 during assembly operation of the brake, the third springs 17 mounted on the outer pad 14 are urged circumferentially inwardly, i.e., toward each other, and compressed by the arms 22 as shown in FIG. 1 to introduce the assembly 10b between the arms 22. Thus, the guiding action of the third springs 17 facilitates inserting the assembly 10b between the arms 22 on the support 21. After completing the operation to introduce the caliper assembly 10b, the arms 22 cease to push the springs 17 and so they expand circumferentially outwardly to the positions indicated by the solid lines until their front ends comes into resilient contact with the inclined surfaces 23a of the clips 23. Under this condition, the caliper assembly 10b is held in position relative to the support 21, and the holes in the slide pins 25 fixed to both the body 11 and the support 21 face each other. Hence, the assembly 10b can be mounted with ease. Further, the outer pad 14 is prevented from bouncing, because the resilience of the third springs 17 cause the protrusions 14d of the outer pad 14 to resiliently engage with the arms 22 on the support 21. Consequently, the springs 17 keep the outer pad 14 from rattling.

Also in the present example, the first spring 15 supports the inner pad 13 in such a way that the pad 13 is slightly displaced toward the axis of the disk rotor 10a and carried on the piston 12. Therefore, when the pad 13 is brought into engagement with the arms on the support 21, the pad is slightly raised toward the outer periphery of the rotor 10a, pressing the leg 15d of the first spring 15 against the inner wall of the hole 12a inside the piston 12. Consequently, the first spring 15 prevents the inner pad 13 from rattling.

While a preferred embodiment of the invention has been described using specific terms, such description is illustrative purposes only, and it is to be understood that changes and variations may be made without departing from the spirit and scope of the following claims.

What is claimed is:

1. An integral-type disk brake comprising:
   a caliper assembly which further comprises a caliper body, an inner pad held to a piston via a spring member within the caliper body, and an outer pad held opposite to the inner pad and kept at a certain distance from the inner pad via a spring member;
   a pair of arms circumferentially spaced a certain distance from each other along the outer periphery of a disk rotor mounted on a support, the caliper assembly being disposed between the arms so as to extend over the outer periphery of the disk rotor;
   a pair of protrusions extending radially outwardly from opposite ends of metal back plates attached to the inner and outer pads, the opposite ends being at the side of the outer periphery of the disk rotor, the protrusions being in engagement with the arms on the support, and the caliper assembly being held to the support in such a way that it can slide axially of the disk rotor; and
   a pair of spring members mounted at opposite ends of the metal back plate attached to the outer pad, the opposite ends being at the side of the axis of the disk rotor, the spring members extending toward the outer periphery of the disk rotor and being capable of being circumferentially deflected toward and away from each other, front ends of the pair of spring members being in resilient contact with bottom surfaces of the arms which are at the side of the axis of the disk rotor wherein the bottom surfaces of the arms with which the front ends of the pair of spring members are in resilient contact incline circumferentially outwardly as said bottom surfaces move toward the axis of the rotor each of the pair of spring members further comprise leaf spring means which include a U-shaped mounting portion, a bent portion formed like a loop, a flat plate portion extending from the front end of the bent portion in such a way that a front end thereof engages with a respective one of the inclined surfaces of the arms, the mounting portion having a pair of fingers which resiliently grip the side ends of the metal back plate attached to the outer pad on axially opposite sides of the disk rotor, the bent portion extending from the side end of the mounting portion which is at the side of the axis of the disk rotor and to which the fingers of the mounting portion are attached and wherein the bent portions of the spring members are spaced apart a distance less than the distance between the arms such that said caliper assembly is insertable between said pair of arms in a radially inward direction.

2. An integral-type disk brake as set forth in claim 1, wherein clips are mounted among their respective arms and the metal back plates attached to the pads and are mounted to their respective arms, each of the clips having a tongue interposed between the front end of the flat plate portion of each spring member and the corresponding arm.

3. An integral-type disk brake as set forth in claim 1, wherein the spring member that supports the inner pad has a plurality of legs resiliently engaging an inner wall of a hole inside the piston, the spring member being mounted on a back portion of the inner pad and acting to displace the inner pad from a position occupied when the caliper assembly is being assembled toward the axis of the disk rotor when the inner pad is mounted on the piston.

* * * * *